(12) United States Patent
Dahi Taleghani et al.

(10) Patent No.: US 10,005,953 B2
(45) Date of Patent: Jun. 26, 2018

(54) SHAPE MEMORY POLYMER PROPPANTS, METHODS OF MAKING SHAPE MEMORY POLYMER PROPPANTS FOR APPLICATION IN HYDRAULIC FRACTURING TREATMENTS

(71) Applicant: Board of Supervisors of Louisiana State University and Agricultural and Mechanical College, Baton Rouge, LA (US)

(72) Inventors: Arash Dahi Taleghani, Baton Rouge, LA (US); Amir Shojaei, Houston, TX (US); Guoqiang Li, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 0 days. days.

(21) Appl. No.: 14/932,202

(22) Filed: Nov. 4, 2015

(65) Prior Publication Data
US 2017/0121591 A1  May 4, 2017
US 2017/0362500 A9  Dec. 21, 2017

Related U.S. Application Data

(60) Provisional application No. 62/075,407, filed on Nov. 5, 2014.

(51) Int. Cl.
C09K 8/50 (2006.01)
C09K 8/80 (2006.01)

(52) U.S. Cl.
CPC ............... *C09K 8/80* (2013.01); *C09K 8/805* (2013.01)

(58) Field of Classification Search
None
See application file for complete search history.

(56) References Cited

U.S. PATENT DOCUMENTS

| | | | |
|---|---|---|---|
| 7,086,460 B2 | 8/2006 | Nguyen et al. | |
| 8,485,265 B2 | 7/2013 | Marya et al. | |
| 2009/0125280 A1 | 5/2009 | Soliman et al. | |
| 2009/0205826 A1* | 8/2009 | Rodriguez | C09K 8/80 166/280.2 |
| 2012/0190593 A1* | 7/2012 | Soane | C09K 8/03 507/111 |
| 2014/0332220 A1* | 11/2014 | Garza | E21B 37/00 166/311 |

(Continued)

OTHER PUBLICATIONS

Cipolla, C.L., et al, 2010, The Relationship Between Fracture Complexity, Reservoir Properties, and Fracture-Treatment Design, Paper SPE 115769, SPE Annual Technical Conference and Exhibition, Denver, Colorado.

(Continued)

*Primary Examiner* — Jeffrey Washville
(74) *Attorney, Agent, or Firm* — Thomas | Horstemeyer, LLP

(57) ABSTRACT

The present disclosure provides for shape memory proppants, methods for making shape memory proppants, and methods of using shape memory proppants, and the like. The strong expandable proppants of the present disclosure may be used in maintaining fracture openings.

3 Claims, 4 Drawing Sheets

(56) References Cited

U.S. PATENT DOCUMENTS

2015/0096751 A1* 4/2015 Shen .................. C09K 8/685
166/280.2
2016/0137912 A1* 5/2016 Sherman .............. C09K 8/805
166/280.2

OTHER PUBLICATIONS

Dahi Taleghani, A., 2010, Fracture Re-Initiation as a Possible Branching Mechanism during Hydraulic fracturing, ARMA annual symposium, Salt Lake city, UT.

Lacy, L. L., A. R. Rickards, and D. M. Bilden. 1998, Fracture width and embedment testing in soft reservoir sandstone, SPE drilling & completion 13.01 (1998): 25-29.

Li, G. and D. Nettles, 2010, Thermomechanical characterization of a shape memory polymer based self-repairing syntactic foam, Polymer 51(3)755-762.

Li, G. and A. Shojaei, 2012, A Viscoplastic Theory of Shape Memory Polymer Fibers with Application to Self-Healing Materials, Proceedings of the Royal Society A-Mathematical Physical and Engineering Sciences 468(2144) 2319-2346.

Li, G., and N. Uppu, 2010, Shape Memory Polymer Based Self-Healing Syntactic Foam: 3-D Confined Thermomechanical Characterization, Composites Science and Technology 70(9)1419-1427.

Li, G. and W. Xu, 2011. Thermomechanical Behavior of Thermoset Shape Memory Polymer Programmed by Cold-Compression: Testing and Constitutive Modeling, Journal of the Mechanics and Physics of Solids 59(6)1231-1250.

Hager, M.D., S. Bode, C. Weber, U.S. Schubert, 2015, Shape memory polymers: Past, present and future developments, Progress in Polymer Science 49-50 3-33.

Narpinski, N.R., and Teufel, L.W., 1987, Influence of Geologic Discontinuities on Hydraulic Fracture Propagation, SPE Journal of Petroleum Technology 39(2).

Wen, Q., Zhang, S., Wang, L., Liu, Y., & Li, X., 2007, The effect of proppant embedment upon the long-term conductivity of fractures. Journal of Petroleum Science and Engineering 55(3), 221-227.

Shi, Y., Mitra Yoonessi, and R. A. Weiss, 2013, High Temperature Shape Memory Polymers, Macromolecules 46 (10) 4160-4167.

* cited by examiner

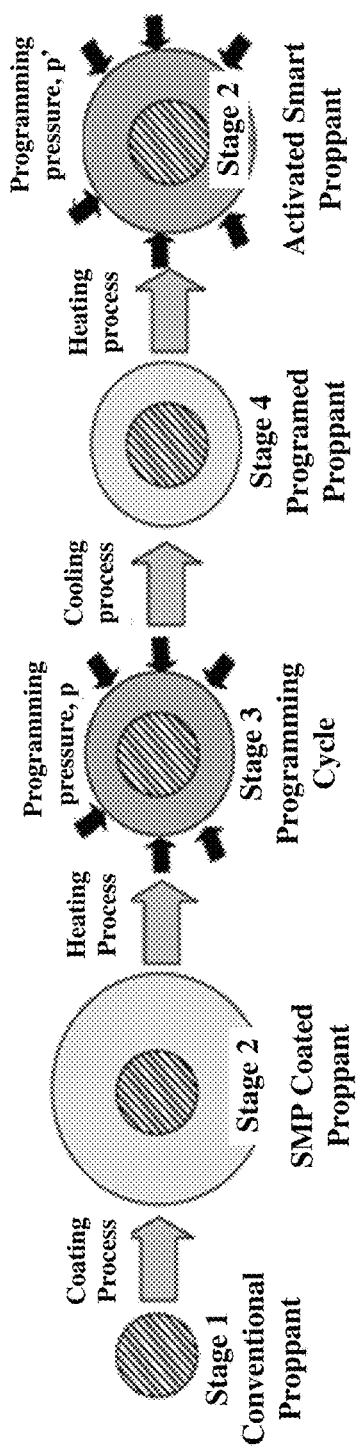
FIG. 4
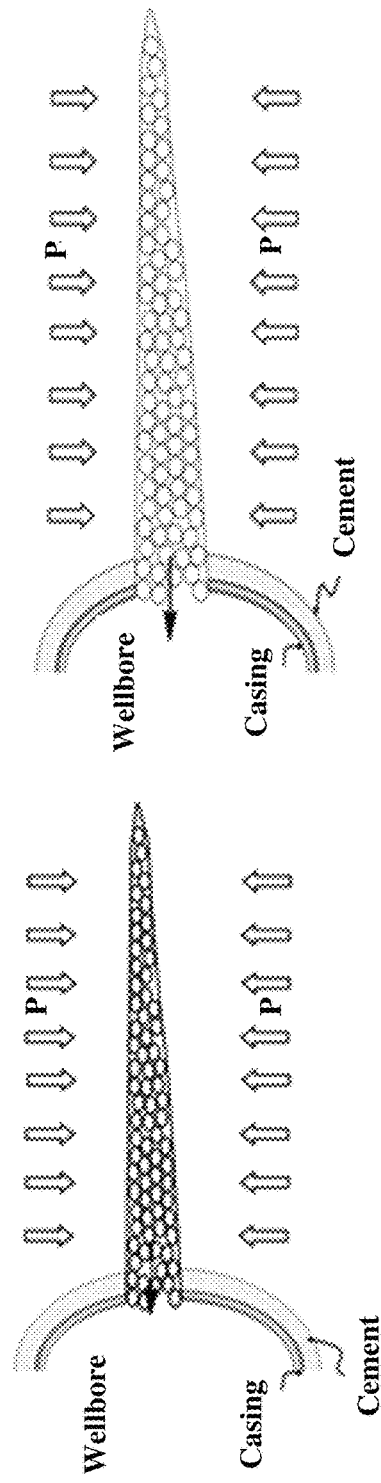
FIG. 5A
FIG. 5B

SHAPE MEMORY POLYMER PROPPANTS, METHODS OF MAKING SHAPE MEMORY POLYMER PROPPANTS FOR APPLICATION IN HYDRAULIC FRACTURING TREATMENTS

CROSS-REFERENCE TO RELATED APPLICATIONS

This application claims the benefit of and priority to U.S. Provisional Application Ser. No. 62/075,407, having the title "SHAPE MEMORY POLYMER PROPPANTS AND METHODS OF MAKING SHAPE MEMORY POLYMER PROPPANTS FOR APPLICATION IN HYDRAULIC FRACTURING TREATMENTS", filed on Nov. 5, 2014, the disclosure of which is incorporated herein in by reference in its entirety.

BACKGROUND

Oil and gas production in both conventional and unconventional low permeability reservoirs has been heavily relied on hydraulic fracturing technology in the last two decades. By utilizing excessive hydraulic pressure to crack the formation rock, artificially generated preferential flow paths from the wellbore to the formation could increase the contact area between well and reservoir by orders of magnitude. Consequently, flow of hydrocarbons can be significantly facilitated by highly permeable induced fractures. Proppants are used to keep the fracture walls apart to create a conductive path to the wellbore after pumping has stopped and the fracturing fluid has leaked off. Placing the suitable concentration and type of proppant in the fracture is critical to the success of a fracturing treatment. Factors affecting the fracture conductivity (a measurement of how a propped fracture is able to pass the produced fluids over the production life of the well) are proppant grain size distribution, proppant-pack permeability, physical properties of the proppant, and long-term degradation of the proppant. To open and propagate a hydraulic fracture, fluid pressure must overcome the in situ stresses. Proppants are injected with the fracturing fluid to prevent the potential closure. After the well is put on production, earth stress acts to close the induced fracture and confine the placed proppants (see FIG. 1). If the proppant strength is inadequate, the closure stress closes the fracture or crushes the proppant, which reduces the conductivity of the proppant pack. Thus, there is a need to produce strong expandable proppants that overcome current limitations.

SUMMARY

Embodiments of the present disclosure provide for a shape memory polymer proppant, methods of making a shape memory polymer proppant, and methods of use for a shape memory polymer proppant.

An embodiment of the present disclosure includes a shape memory polymer proppant, wherein the proppant has an activated state and a programmed state, wherein in the programmed state of the proppant has a programmed state diameter, wherein in the activated state of the proppant has an activated state diameter, wherein the activated state diameter is equal to or greater than the programmed state diameter, wherein the proppant in the programmed state will convert to the proppant in the activated state when an activation condition is applied to the proppant in the programmed state, wherein the activation condition is selected from the group consisting of: an activation temperature, a moisture, a light, a pH, a magnetic field, an ultrasonic current, electricity current, and a combination thereof. In an embodiment, the polymer material is a thermoplastic shape memory polymer or a thermosetting shape memory polymer. In an embodiment, the shape memory polymer proppant has a core surrounded by the polymer material.

An embodiment of the present disclosure also includes a method of making a shape memory polymer proppant, comprising: making a shape memory polymer proppant, comprising: providing a shape memory polymer proppant, wherein the proppant has a starting state, a programmed state, and an activated state; changing the shape memory polymer proppant from the starting state to the programmed state; cooling the shape memory polymer proppant in the programmed state under the first pressure to a cooling temperature, wherein the shape memory polymer proppant remains in the programmed state after cooling; and heating the shape memory polymer proppant in the programmed state to a activation condition, wherein the activation condition is selected from the group consisting of: an activation temperature, a moisture, a light, a pH, a magnetic field, an ultrasonic current, electricity current, and a combination thereof wherein in the starting state of the proppant has a starting diameter, wherein in the programmed state of the proppant has a programmed state diameter, wherein in the activated state of the proppant has an activated state diameter, wherein the starting diameter is greater than the programmed state diameter, wherein the activated state diameter is equal to or greater than the programmed state diameter, wherein the proppant in the programmed state will convert to the proppant in the activated state when an activation temperature is applied to the proppant in the programmed state. In an embodiment, the activated state diameter is about 100 μm to 1 mm, and the programmed state diameter is about 100 μm to 1 mm and the activated state diameter is equal to or greater than the programmed diameter.

An embodiment of the present disclosure also includes a method of providing a shape memory polymer proppant, wherein the proppant has an activated state and a programmed state, wherein in the activated state of the proppant has an activated state diameter, wherein in the programmed state of the proppant has a programmed state diameter, wherein the activated state diameter is equal to or greater than the programmed state diameter, wherein the proppant in the programmed state will convert to the proppant in the activated state when an activation temperature is applied to the proppant in the programmed state, wherein the shape memory polymer proppant is in the programmed state; exposing the shape memory polymer proppant in the programmed state to the activation condition, wherein the activation condition is selected from the group consisting of: an activation temperature, a moisture, a light, a pH, a magnetic field, an ultrasonic current, electricity current, and a combination thereof; and converting the shape memory polymer proppant in the programmed state to the shape memory polymer in the activated state upon exposure to the activation condition, wherein the diameter of the shape memory polymer proppant in the activated state has a diameter that is equal to or greater than the diameter of the shape memory polymer proppant in the programmed state. In an embodiment, the activation temperature is about 70 to 180° C. in an embodiment, the activated state diameter is about 100 μm to 1 mm, the programmed state diameter is about 100 μm to 1 mm, and the activated state diameter is equal to or greater than the programmed state diameter.

Other apparatus, methods, features, and advantages will be or become apparent to one with skill in the art upon examination of the following drawings and detailed description. It is intended that all such additional apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure.

FIG. 4 demonstrates the manufacturing and programming process of SMP based proppants.

FIGS. 5A-B show a propped fracture with PMA proppants before (FIG. 5A) and after activation (FIG. 5B).

DISCUSSION

Figure 1:
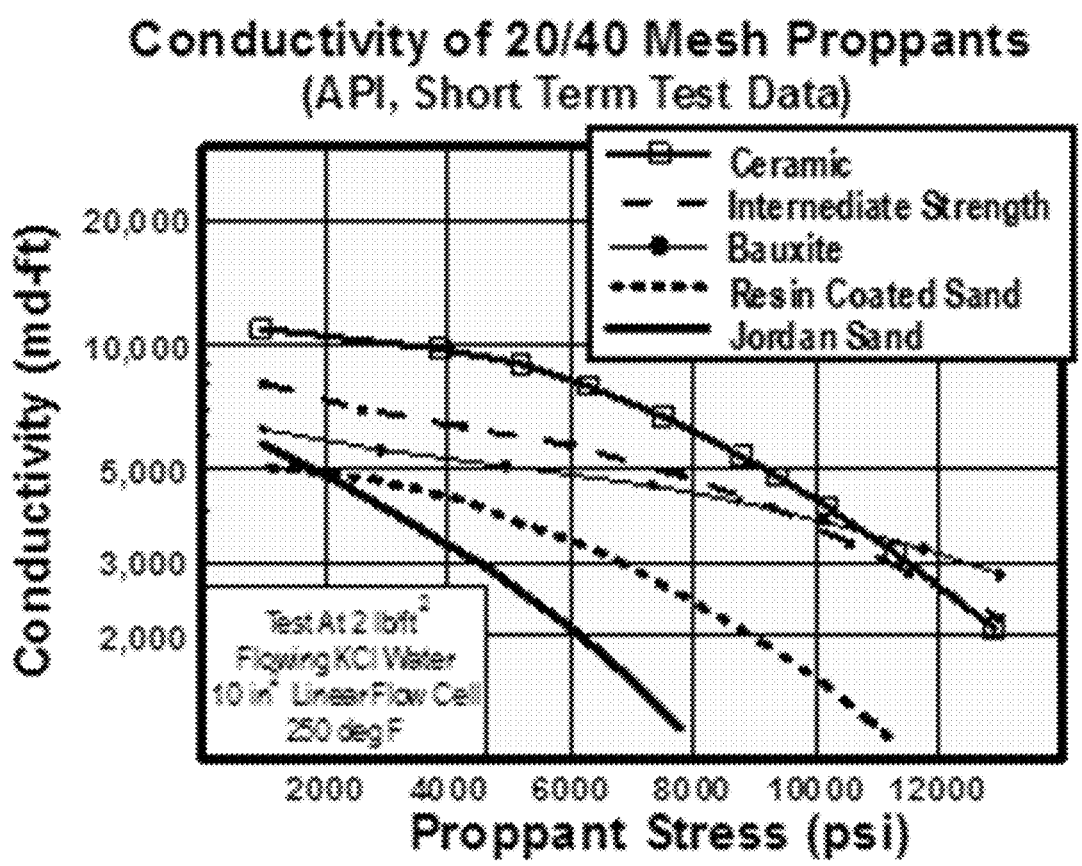
FIG. 1 illustrates that in regular proppants, due to the effective stress increase, hydraulic conductivity of fractures diminishes gradually.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of chemistry, material science, and the like, which are within the skill of the art. Such techniques are explained fully in the literature.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for shape memory polymer proppants, methods of making shape memory polymer proppants, methods of using shape memory polymer (SMP) proppants, methods for treating hydraulic fractures using shape memory polymer proppants, and the like. Embodiments of the present disclosure can be used in hydraulic fracturing in oil and gas production, in particular in soft shale gas production. Proppants of the present disclosure can be remotely controlled by in-situ heating during service conditions without the need to interrupt the production process. Embodiments of the proppants can be "programmed" through mechanical loading and its shape memory effect can be activated through phase transformation. Active control of the proppants provides engineers the ability to maintain or increase the fracture width during production stages to enhance the hydraulic conductivity of the fracture (well productivity). In other words, the fracture conductivity can be maintained for longer periods of time to enhance oil and gas production.

In an embodiment, the shape memory polymer proppant has a starting state, a programmed state, and an activated state. A more detailed description of the states and conversion of the states are provided below in reference to making the shape memory polymer proppant and the Example. In the starting state, the proppant has a starting diameter. In the programmed state, the proppant has a program state diameter. In the activated state, the proppant has an activated state diameter. In an embodiment, the starting state has a diameter greater than the programmed state, while the programmed state has a diameter that is less than that of the activated state. In an embodiment, the starting diameter can be about 100 μm to 2 mm. In an embodiment, the programmed state diameter can be about 100 μm to 1 mm and the activated state diameter can be about 100 μm to 2 mm. In an embodiment, the shape memory proppant in the starting state is about 20 to 70% larger than the shape memory proppant in the programmed state. In an embodiment, the shape memory polymer proppant in the activated state is about 20 to 50% larger than the shape memory polymer proppant in the programmed state.

If the shape memory polymer proppant is not spherical in shape, one or more of the dimensions of the shape memory polymer proppant (e.g., length, width) will increase in value upon conversion from the programmed state to the activated state. Use of the term "diameter" throughout the disclosure is done for convenience and clarity, and one or more of the dimensions for non-spherical shape memory polymer proppants can correspond to the diameter dimension as used in the descriptions provided herein.

The shape memory polymer proppant in the programmed state will convert to the shape memory polymer proppant in the activated state when an activation condition is applied to the shape memory polymer proppant in the programmed state. In an embodiment, the activation condition can be an activation temperature, a moisture, a light, a pH, a magnetic field, an ultrasonic current, electricity current, and a combination thereof. In an embodiment, the activation temperature can be about 70° C. to 180° C., and is within or above the transition temperature of the polymer. The shape memory polymer proppant in the programmed state can be exposed to the activation temperature in-situ in a well fracture, and as a result the width of the fracture can be maintained or increased as the diameter of the shape memory polymer proppant increases to that of the shape memory polymer proppant in the activated state.

In an embodiment, the shape memory polymer proppant can be composed entirely of a shape memory polymer material or can have a coating layer of shape memory polymer material around a core. In an embodiment, the shape memory polymer proppant not including a core can have a diameter of about 20 µm to 2 mm or about 100 µm to 2 mm when the shape memory polymer proppant is in the starting state.

In an embodiment, the core can be a grain of sand, bauxite, ceramics, or other similar particle. In an embodiment, the core can have a diameter (or one or more of dimensions of a non-spherical core) of about 10 to 50 microns. In an embodiment, the layer of polymer can have a thickness of about 10 to 300 microns when the shape memory polymer proppant is in the activated state. In an embodiment, the layer of polymer can have a thickness of about 5 to 200 microns when the shape memory polymer proppant is in the programmed state. In an embodiment, the polymer is in the range of 25% to 99% by weight.

In an embodiment, the polymer can be a thermoplastic shape memory polymer. In an embodiment, the thermoplastic shape memory polymer can be selected for instance from organic thermoplastic polymer in the polyaryletherketone (PAEK) family (e.g., polyether ether ketone (PEEK)), polypropylene (PP), polystyrene, polyurethane, polynorbornene (e.g., polynorbornene units that are partially substituted by polyhedral oligosilsesquioxane (POSS)), polyester, polyether, polyethylene terephthalate (PET), polyethyleneoxide (PEO), poly(1,4-butadiene), poly(vinyl acetate), polyamide-6 (nylon-6), poly(tetrahydrofuran), poly(2-methyl-2-oxazoline), poly(ethylene adipate), MDI/1,4-butanediol, poly(ε-caprolactone), poly vinyl chloride, polyethylene/polyamide blend, and a combination thereof.

In an embodiment, the shape memory polymer can be a thermosetting shape memory polymer. In an embodiment, the thermosetting shape memory polymer can be selected for instance from an organic thermosetting polymer in the epoxy family (e.g. bisphenol A diglycidyl ether, bisphenol F, epoxidised novolacs, aliphatic epoxy resins, glycyylamin epoxy resin, and the like) or a phenolic family (e.g. Novolacs (formaldehyde/phenol<1), Resoles (formaldehyde/phenol>1), polyhydroxyphenols, and the like). They can also be a blend, a composite, or an interpenetration network of thermoplastic and thermosetting shape memory polymers.

In an embodiment, the shape memory polymer proppant can be included in a mixture including sand, bauxite, and/or ceramic and/or other types of proppants, where different types can have different dimensions, made of different polymers, be made of a solid polymer material, be of a core/shell design (e.g., polymer material layer around a core), combinations thereof, and the like.

In an embodiment, the shape memory polymer proppant can be made by heating the shape memory polymer proppant in the starting state to a programming temperature under a first pressure to form the shape memory polymer proppant in the programmed state. Subsequently, the shape memory polymer proppant in the programmed state is cooled under the first pressure to a cooling temperature (ambient temperature of about 0 to 40° C.), where the shape memory polymer proppant remains in the programmed state after cooling. The programming temperature can be about the reservoir temperature. In other words, the programming temperature is greater than the transition temperature of the polymer, and since the molecular chains of the polymer are flexible, the polymer compresses under the first pressure. During the cooling process under the first pressure, the molecular chains of the polymer lock into place, so that when the first pressure is released, the shape memory polymer proppant stays in the programmed state. Heating the shape memory polymer proppant in the programmed state above the transition temperature of the polymer allows the locked molecular chains to release and convert to the activated state having a greater diameter, or with the same diameter but releasing stress to support the fracture opening.

In an embodiment, the shape memory polymer proppant can be used to maintain or widen fractures. Once the shape memory polymer proppant in the programmed state is positioned in the fracture, the shape memory polymer proppant can be subject to the activation condition (e.g., activation temperature). For example, the temperature can increase by injecting material having a higher temperature and/or through heating from the surrounding material. Upon exposure to the activation temperature, the shape memory polymer proppant in the programmed state is converted to the shape memory polymer in the activated state, where the diameter of the shape memory polymer proppant in the activated state has a diameter that is greater than the diameter of the shape memory polymer proppant in the programmed state. In this way, the shape memory polymer proppant can be used to maintain or widen fractures.

While embodiments of the present disclosure are described in connection with the Example and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Hydraulic Fracturing is recognized as the major approach for economic oil and gas production from low permeability reservoirs like shale or tightsand formations. For fractures to stay open after the fracturing treatment, some materials, so called proppants, are needed to be pumped into the fractures to fill the fracture gap and keeps it wide open under the compressive overburden weight. In long term productions from these fractured wells, fractures are prone to closing on proppants as the result of increase in the rock effective stress due to fluid extraction. One of the grand challenges facing the oil and gas industry is how to maintaining the proppant functionality in the subsurface where replacement of proppants is only possible by refracturing the well. In this work, we propose a smart "Expandable Proppants" (EP) to remotely control the force and functionality of injected proppants. The developed smart EP can respond to in-situ heating during its service conditions, without the need to halt any operation at the well site. This smart EP has the capability to be programmed through mechanical loading and its shape memory effect is activated through phase transformation (e.g., activation condition) by temperature, moisture, light, pH, magnetic field, ultrasonic or electricity current. Active control on EP functionality will provide the operators with the ability to maintain the fracture width during production stages and consequently enhances the hydraulic conductivity of the formation. The proposed technology may reduce the need for refracturing due to fracture closure or proppant embedment in soft formation or highly pressurized deep formations.

Introduction:

Proppant compaction, proppant crushing and proppant embedment have posed various challenges for sustainable production from stimulated wells especially in soft and deep formations like Haynesville Shales. Experimental measurements show the strong effect of proppant embedment in reducing fracture conductivity (Lacy et al. 1998, Wen et al. 2007). In general, we can write the stress exerted on proppant bed as $$\sigma_{Prop} = \sigma_{CL} \Delta \sigma_{Width} - BHFP, \quad (1)$$

where $\sigma_{CL}$, is the closure stress which is essentially determined by the tectonic stresses and the depth of the fracture, BHFP is the formation fluid pressure. $\Delta \sigma_{Width}$ is the stress component induced due to fracture opening; wider fractures have more tendency to close on their surfaces. In general, calculating this stress requires accurate stress analysis to incorporate fractures interactions on each other. For the simple case of a single-strand hydraulic fracture with planar geometry the stress component corresponding to crack opening can be simply written as $$\Delta \sigma_{Width} = 2Ew_{Prop}/H\pi \quad (2)$$

where E is the Young's modulus of the rock, H is the fracture height and $w_{prop}$ is the width of the hydraulic fracture at the end of the treatment. Here, we focus our attention on improving fracture transmissibility for a simple case of a double-wing hydraulic fracture. Although, core and outcrop studies on one side and fluid flow behavior on the other side have revealed that most of the unconventional hydrocarbon resources are located in formations that are naturally fractured, such as Marcellus Shale (Pommer et al, 2013) and Barnett Shale (Patel et al, 2013). The presence of natural fractures in these reservoirs could be a double-edge sword to hydrocarbon production. On one hand, open and debonded natural fractures may serve as highly permeable paths for oil and gas flow, which leads to additional productivity. However, hydraulic fractures' interaction with natural fractures may form complex fracture network (Warpinski and Teufel 1987) and makes treatment design more complicated and stimulation results more unpredictable; in low permeability formations, transmissibility between natural fractures become more significant, and fracture fluid flowing through the natural fractures will experience a choke or localized fracture width reduction (Cipolla et al 2010). The intersection of hydraulic fractures with natural fractures are always experiencing large stress concentrations which may magnifies later during production life of the reservoir (Dahi Taleghani, 2010). Placement of expanding proppants in these chokes would guarantee a sustainable hydrocarbon flow through complex fracture network. Hence, expanding proppant may have a more significant impact on production enhancement in the case of complicated fracture networks.

Smart materials have been suggested in the past for a different purpose in hydraulic fracturing treatments. Nguyen and Barton (2003) proposed the use of shape memory alloys (SMA) torsion springs, embedded into dissolvable crusts. The activated SMA springs contact the fracture surfaces and restrict movement of proppant back out of the fracture during the production of fluids from the well. In another attempt for reducing proppant production of a hydraulically fractured well, Rodriguez (2009) introduced hair-like spiral SMA based additives into the fracturing fluid. Smart materials have other applications in oil and gas field including smart downhole devices which are used for controlling downhole operations with minimal intervention for activation/control (Marga and Bhaysar, 2013). These classes of smart devices may use displacement or flow actuators to control/monitor a downhole oilfield operation. In another example, "smart" proppant is proposed to sense downhole condition in which they can store and transmit the data to a data retrieval device on the surface or in the drill string (Soliman et al. 2009). In general, SMAs are very expensive and considerably heavy to be used in large volume as a proppant. Hence, we prefer to explore the possibility of utilizing shape memory polymers (SMP) for this purpose.

Figure 2:
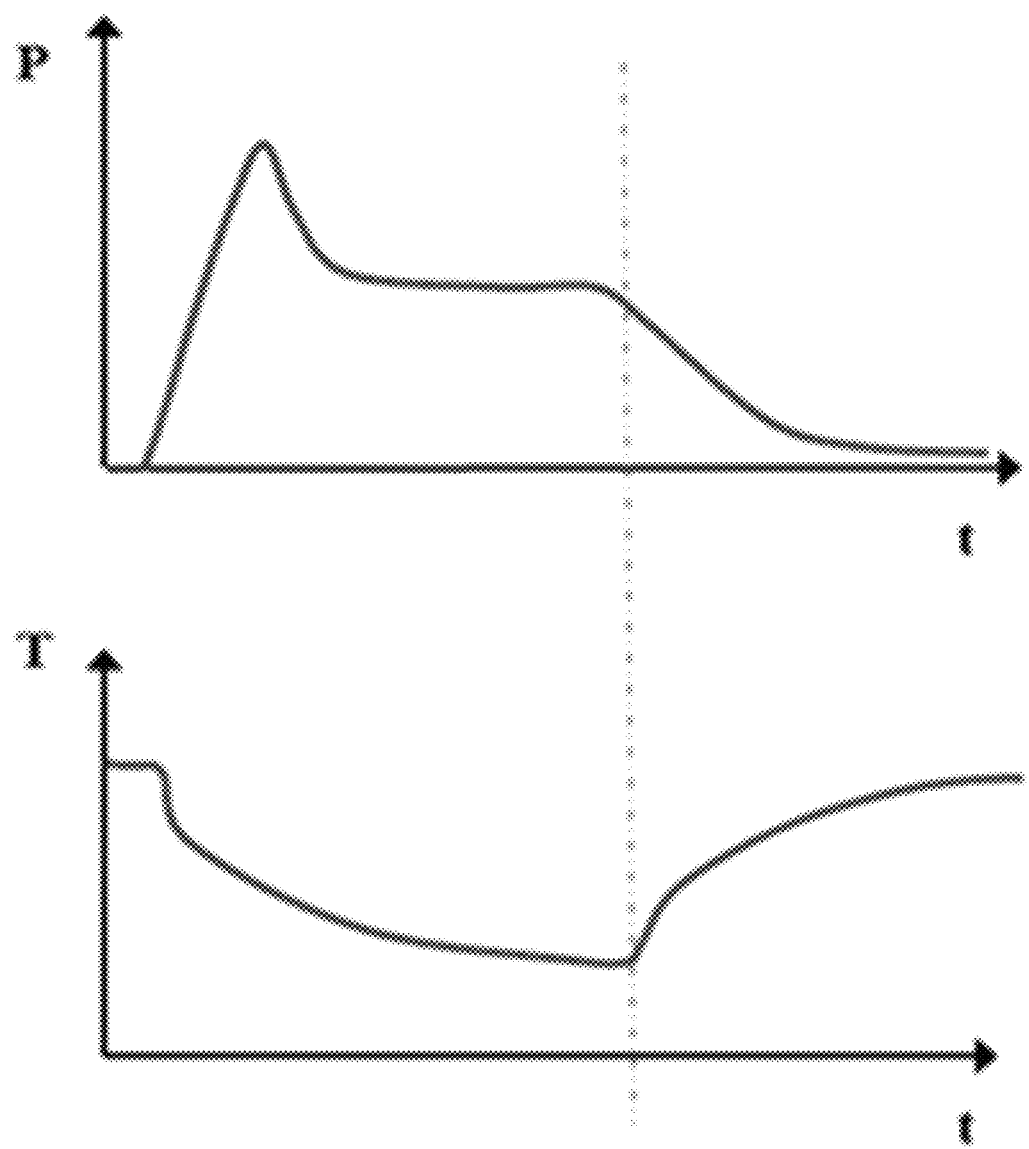
FIG. 2 shows bottomhole net pressure and temperature history during a typical fracturing treatment. Dashed line marks the most likely point for the initiation of secondary fractures.

FIG. 2 shows a typical recording of the bottomhole pressure and temperature measurement during fracture stimulation. Fluid and proppants have been pumped for a period of time, and the termination of the pumping period is marked by a dashed line and followed by an extended period of shut-in that lasts much longer than the pumping time. Of particular interest here is that minimum temperature and minimum fracturing fluid pressure occurs almost simultaneously within a short period of time after pump shut-in. The proposed proppant should not only sustain the high reservoir temperature (high $T_g$) to avoid large plastic deformation but also being slightly below the reservoir temperature to release their stored stress. It is notable that the release stress should be large enough to open the crack but not too large to crush the formation rock, hence we are looking for stress release ranging from 10-50 MPa, which is not a reachable range with most existing shape memory polymers. Additionally, smart proppants can be pumped simultaneously with the regular proppants in the form of batches to locally widen the fractures in patches like a jack.

In this example, we introduce a new generation of SMP based smart proppants, which may actively control and maintain the applied forces on the fracture surfaces; since more expanded proppants would be engaged with the fracture walls, these proppants can simultaneously act as an active filter for preventing sand/proppant production from the well. Applicability, production and functionality of Shape Memory Polymer (SMP) based proppants to enhance fracture conductivity is disclosed in this work.

Figure 3:
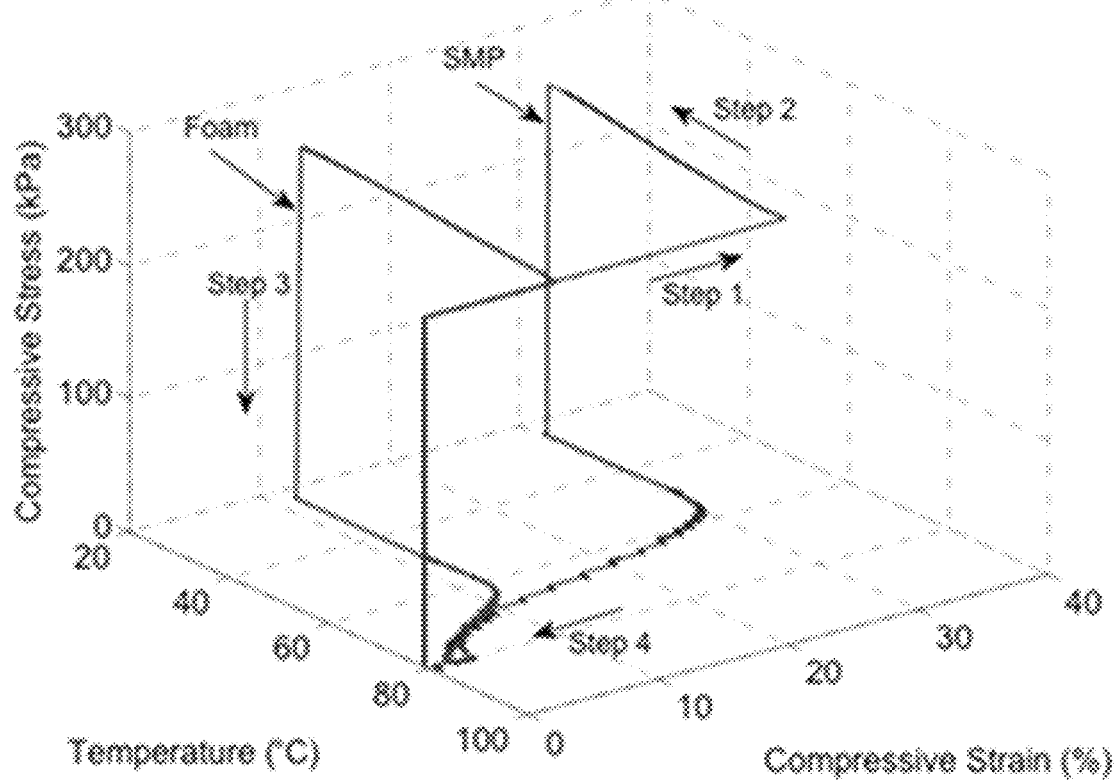
FIG. 3 shows a typical thermomechanical cycle for SMP and SMP foam, figure is after (Li and Nettles 2010).

Shape Memory Based Smart Materials:

Shape memory polymers (SMPs) are capable of storing a prescribed shape indefinitely and recover them by specific external trigger, e.g. heat. SMPs have potential to be deployed in various engineering structures and devices. In the case of Shape Memory materials, the programming and shape recovery process can be well described by the thermomechanical (TM) cycle shown in FIG. 3 for a pure amorphous SMP and SMP based syntactic foam. In general, four steps are included in this cycle: (1) High temperature loading: the temperature is elevated to above the transition temperature, i.e. $T_r$, where the mobility in the SMP molecular network is surged. The SMP molecular chains are flexible in this stage and they can cope with the applied external traction field. (2) Cooling: The SMP is cooled down to below $T_r$ while the external traction field is maintained. In this step, the deformed molecular network retains the induced shape in step 1. (3) Low temperature unloading: The traction is then removed which result in elastic unloading of the SMP and completing the programming process, and (4) Recovery: During the shape recovery stage the temperature is increased beyond the transition temperature where the locked molecular chains are able to restore their original configuration and in this step, the SMP releases its memory (see Li and Nettles 2010; Li and Uppu 2010; Hager et al, 2015). Considering the high temperature of oil and gas reservoirs, both thermoplastic and thermoset SMPs can be used for this purpose. Programming can also be conducted at temperatures below the transition temperature such as cold compression programming for amorphous thermosetting SMPs (Li and Xu 2011) or cold-drawing programming for semi-crystalline thermoplastic SMPs (Li and Shojaei 2012). Theoretically, SMP recovers once the temperature enters the glass transition ($T_g$) region (usually, $T_g$ is the center of this region). If recovery occurs at the lower temperature side of the $T_g$ region, the recovery rate is low, but SMP proppant will ultimately recover to the final shape at reasonable time scale before production drop in the wellbore. It is notable that, by so-called cold programming (Li and Xu 2011), programming may not need the typical heating and cooling process.

There are SMP developed with polyether ether ketone (PEEK) which is a semicrystalline thermoplastic polymer with transition temperature higher than 150° C. and good mechanical strength and Young's modulus. All these properties make this material desirable for the application in hydraulic fracturing treatments (Shi et al. 2013).

Smart Proppant Design and Applications:

Due to the high cost of other smart materials, SMP would be a more practical option for manufacturing smart proppants. SMPs can be used as proppants in two forms. In the first form, SMP particles can be mixed with the regular proppants (for instance sand particles) and then is being pumped into the fracture. In the second case, the conventional sand based proppants are coated with SMP material and then the coating is programmed under higher temperature in which hydraulic forces are used to deform the SMP at elevated temperature. By maintaining an applied pressure during cooling cycle, the SMP coating is programmed. FIG. 4 demonstrates the manufacturing and programming process of SMP based proppants. In the case of SMP based proppants, the conventional sand based proppants are coated with an SMP material (stages 1 and 2 in FIG. 4). The coated proppant then undergoes programming cycle (stage 3 in FIG. 4) which is (a) heating process until $T>T_g$, (b) applying hydrostatic pressure P, (c) while maintaining the pressure the temperature is decreased to $T<T_g$. The programmed proppant (stage 4 in FIG. 4) is now ready to be deployed in fractured volume. Upon heating the programmed proppants, the SMP coating is activated and recovers its original shape. During the process of the shape recovery, released pressure will act on the fracture surfaces to keep the fracture open or even widen the fracture.

The smart proppant in this case is activated via heating sources from the wellbore environment and it can effectively widen the gaps within the fractures (FIGS. 5A-B). These expanding proppants may also be used in the last batch of pumped slurry to retain the proppants inside the fracture. Proppant flow-back may occur in very low-permeable formations; the expanded proppants would prevent the proppants from flowing back into the wellbore.

A new generation of proppants is proposed in this disclosure to prevent or at least postpone hydraulic fractures closure to enhance the production from unconventional hydrocarbon reservoirs. Currently, hydraulic fracturing is a main venue for economic oil and gas production from low permeability shale reservoirs but production usually diminishes after a short time after well stimulation. Increase in rock closure stress due to fluid extraction may crash proppant or cause proppant embedment in the long-term. The proposed smart proppants provide the capability to in-situ maintain/control proppants' functionality. The developed smart EP can respond to in-situ heating during its service conditions, without the need for refracturing the well. This smart EP has the capability to be programmed through mechanical loading, its shape memory effect can then be activated through phase transformation. Considering the fact that the proposed smart proppants can be manufactured in different sizes without any practical limitation, any given proppant size distribution to obtain a certain proppant bed permeability can be achieved using this technology.

REFERENCES

Cipolla, C. L., et al, 2010, The Relationship Between Fracture Complexity, Reservoir Properties, and Fracture-Treatment Design, Paper SPE 115769, SPE Annual Technical Conference and Exhibition, Denver, Colo.

Dahi Taleghani, A., 2010, Fracture Re-Initiation as a Possible Branching Mechanism during Hydraulic fracturing, ARMA annual symposium, Salt Lake city, Utah.

Lacy, L. L., A. R. Rickards, and D. M. Bilden, 1998, Fracture width and embedment testing in soft reservoir sandstone, *SPE drilling & completion* 13.01 (1998): 25-29

Li, G. and D. Nettles, 2010, Thermomechanical characterization of a shape memory polymer based self-repairing syntactic foam, Polymer 51(3)755-762.

Li, G. and A. Shojaei, 2012, A Viscoplastic Theory of Shape Memory Polymer Fibers with Application to Self-Healing Materials, Proceedings of the Royal Society A-Mathematical Physical and Engineering Sciences 468(2144) 2319-2346.

Li, G., and N. Uppu, 2010, Shape Memory Polymer Based Self-Healing Syntactic Foam: 3-D Confined Thermomechanical Characterization, Composites Science and Technology 70(9)1419-1427.

Li, G. and W. Xu, 2011. Thermomechanical Behavior of Thermoset Shape Memory Polymer Programmed by Cold-Compression: Testing and Constitutive Modeling, Journal of the Mechanics and Physics of Solids 59(6) 1231-1250.

Marya, M. and R. Bhaysar, 2013, Smart actuation materials triggered by degradation in oilfield environments and methods of use, Schlumberger Technology Corporation: U.S. Pat. No. 8,485,265 B U.S. Pat. No. 8,485,262.

Nguyen, P. D. and J. A. Barton, 2003, In-situ filters, method of forming same and systems for controlling proppant flowback employing same. I. Halliburton Energy Services. USA: U.S. Pat. No. 7,086,460 B U.S. Pat. No. 7,086,462.

Hager, M. D., S. Bode, C. Weber, U. S. Schubert, 2015, Shape memory polymers: Past, present and future developments, Prorgess in Polymer Science 49-50 3-33.

Rodriguez, A., 2009, Method for Increasing the Fluid Productivity of a Hydraulically Fractured Well. USA: US20090205826 A20090205821.

Soliman, M. Y., L. E. East and D. D. Fulton, 2009, Methods for geomechanical fracture modeling. USA, Halliburton Energy Services, Inc.: US20090125280 A20090125281.

Warpinski, N. R., and Teufel, L. W., 1987, Influence of Geologic Discontinuities on Hydraulic Fracture Propagation, SPE Journal of Petroleum Technology 39(2).

Wen, Q., Zhang, S., Wang, L., Liu, Y., & X., 2007, The effect of proppant embedment upon the long-term conductivity of fractures. Journal of Petroleum Science and Engineering 55(3), 221-227, Shi, Y., Mitra Voonessi, and R. A. Weiss, 2013, High Temperature Shape Memory Polymers, Macromolecules 46(10)4160-4167.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method, comprising:
    providing a shape memory polymer proppant to a fracture in a well, wherein the shape memory polymer proppant is composed entirely of a shape memory polymer material where the shape memory polymer material is a thermoplastic shape memory polymer, a thermosetting shape memory polymer, or a combination thereof, wherein the proppant has an activated state and a programmed state, wherein in the activated state of the proppant has an activated state diameter, wherein in the programmed state of the proppant has a programmed state diameter, wherein the activated state diameter is equal to or greater than the programmed state diameter, wherein the proppant in the programmed state will convert to the proppant in the activated state when an activation temperature is applied to the proppant in the programmed state, wherein the shape memory polymer proppant is in the programmed state;
    exposing the shape memory polymer proppant in the programmed state to the activation condition in the fracture, wherein the activation condition is an activation temperature; and
    converting the shape memory polymer proppant in the programmed state to the shape memory polymer in the activated state upon exposure to the activation condition in the fracture, wherein the diameter of the shape memory polymer proppant in the activated state has a diameter that is equal to or greater than the diameter of the shape memory polymer proppant in the programmed state,
    wherein the activated state diameter is about 100 μm to 1 mm, wherein the programmed state diameter is about 100 μm to 1 mm, and wherein the activated state diameter is equal to or greater than the programmed state diameter.

2. The method of claim 1, wherein the thermosetting shape memory polymer is selected from the group consisting of: an epoxy family and a phenolic family.

3. A method, comprising:
    providing a shape memory polymer proppant to a fracture in a well, wherein the proppant has an activated state and a programmed state, wherein in the activated state of the proppant has an activated state diameter, wherein in the programmed state of the proppant has a programmed state diameter, wherein the activated state diameter is equal to or greater than the programmed state diameter, wherein the proppant in the programmed state will convert to the proppant in the activated state when an activation temperature is applied to the proppant in the programmed state, wherein the shape memory polymer proppant is in the programmed state, wherein the shape memory polymer proppant consists of a polymer material, wherein the polymer material is a thermosetting shape memory polymer is selected from the group consisting of: an epoxy family and a phenolic family;
    exposing the shape memory polymer proppant in the programmed state to the activation condition in the fracture, wherein the activation condition is selected from the group consisting of: an activation temperature, a moisture, a light, a pH, a magnetic field, an ultrasonic current, electricity current, and a combination thereof; and
    converting the shape memory polymer proppant in the programmed state to the shape memory polymer in the activated state upon exposure to the activation condition in the fracture, wherein the diameter of the shape memory polymer proppant in the activated state has a diameter that is equal to or greater than the diameter of the shape memory polymer proppant in the programmed state.

* * * * *